(No Model.)
W. HILLMAN.
SADDLE SPRING FOR VELOCIPEDES.
No. 310,823. Patented Jan. 13, 1885.
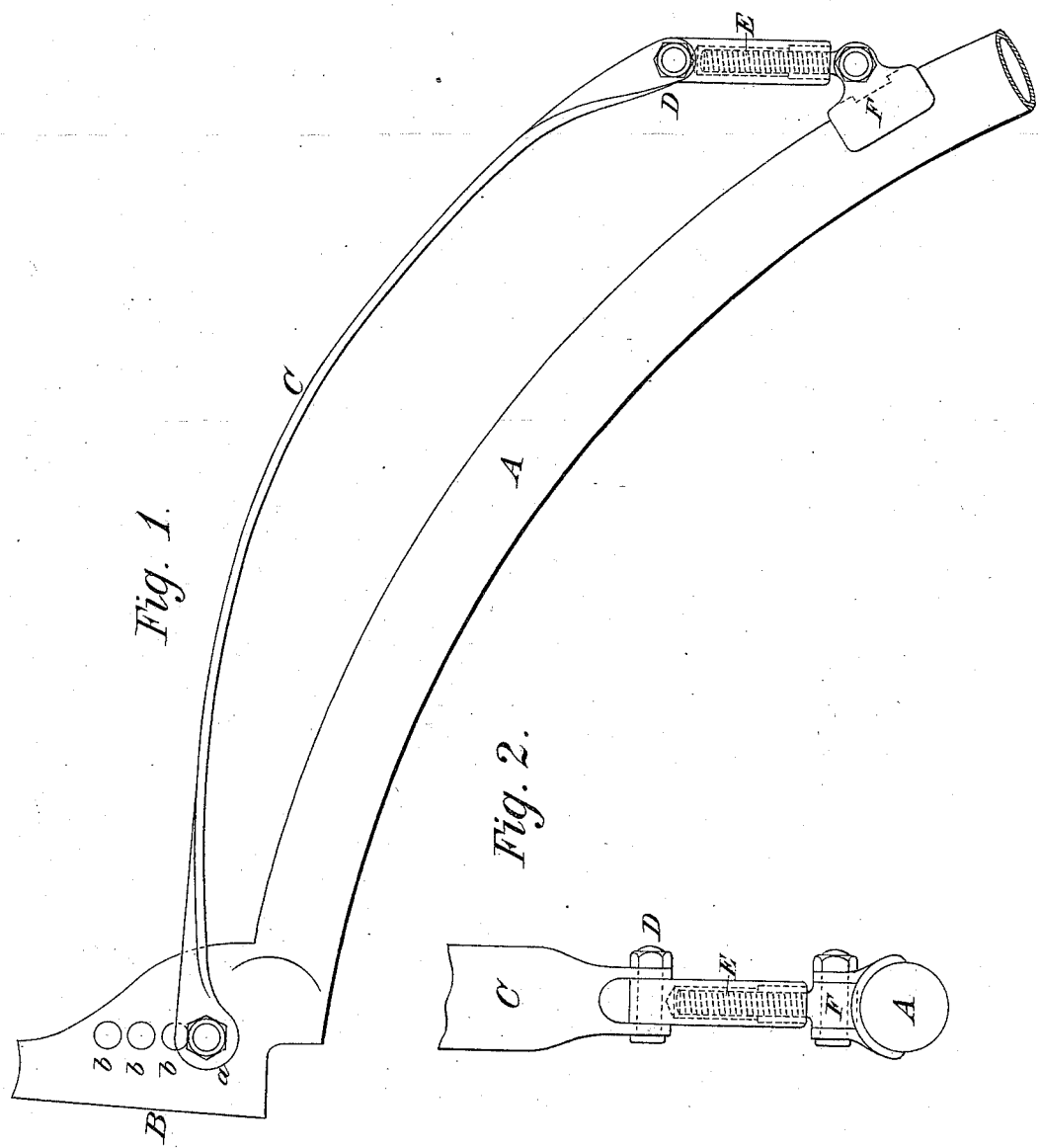

UNITED STATES PATENT OFFICE.

WILLIAM HILLMAN, OF COVENTRY, ENGLAND.

SADDLE-SPRING FOR VELOCIPEDES.

SPECIFICATION forming part of Letters Patent No. 310,823, dated January 13, 1885.

Application filed October 22, 1884. (No model.)

*To all whom it may concern:*

Be it known that I, WILLIAM HILLMAN, a subject of Her Majesty the Queen of the United Kingdom of Great Britain and Ireland, residing at Coventry, England, have invented a new and useful Improvement in Saddle-Springs for Bicycles and Velocipedes, of which the following is a description.

In the drawings, Figure 1 is a side elevation, and Fig. 2 a rear view, of the device.

A represents the "backbone" of the bicycle or velocipede, and B the upper part or "neck" thereof.

My invention has for its object the construction of a saddle-spring to rest on this backbone. For that purpose I provide a series of vertical holes, $a\ b\ b\ b$, in the neck of the bicycle or velocipede backbone. The spring C, upon which the saddle is placed, is attached to any one of these holes by a bolt to vary the height or position of the saddle. The other end of the spring is linked to a screwed sleeve or socket, D, which engages with a screwed rod, E, linked to a bracket, F, on the backbone.

To adjust the spring, the bolt is taken out of the hole in the neck, which leaves the screwed socket and rod forming the rocking link free and yielding. The bolt at the top of the spring may then be replaced in any of the holes in the neck and screwed by the bolt, when the saddle is ready for use.

Having thus described my invention, I claim—

An improved saddle-spring for bicycles and velocipedes, consisting of a spring adjusted to the backbone of the bicycle or velocipede, provided with a series of vertical holes at the upper end or neck of the backbone, and adjusted there by means of a bolt, and having at the lower end a screwed sleeve or socket engaging a screwed rod linked to a bracket on the backbone, substantially as and for the purpose above set forth.

WILLIAM HILLMAN.

Witnesses:
EDWARD K. JONES,
JAMES RICHARDS.